United States Patent [19]
Wells

[11] Patent Number: 5,201,941
[45] Date of Patent: Apr. 13, 1993

[54] PROCESS FOR INTRODUCING ADDITIVE SUBSTANCES WHICH ARE CAPABLE OF FLOW INTO A METALLURGICAL VESSEL AND A VESSEL FOR THAT PROCESS

[75] Inventor: William Wells, Aylesbeare/Exeter, Great Britain

[73] Assignee: Kortec AG, Switzerland

[21] Appl. No.: 720,467

[22] PCT Filed: Oct. 26, 1990

[86] PCT No.: PCT/EP90/01902
§ 371 Date: Aug. 23, 1991
§ 102(e) Date: Aug. 23, 1991

[87] PCT Pub. No.: WO91/06683
PCT Pub. Date: May 16, 1991

[30] Foreign Application Priority Data
Nov. 3, 1989 [DE] Fed. Rep. of Germany ....... 3936715

[51] Int. Cl.⁵ .................... C21C 5/40; C21C 7/00
[52] U.S. Cl. ................... 75/414; 75/533; 75/545; 75/560; 75/570; 266/144; 266/216; 266/221; 266/218; 266/155
[58] Field of Search ........... 266/155, 144, 156, 157, 266/176, 186, 190, 192, 193, 194, 221, 216, 218; 75/707, 709, 501, 531, 414, 533, 545, 560, 570

[56] References Cited

U.S. PATENT DOCUMENTS

| | | |
|---|---|---|
| 3,373,796 | 3/1968 | Vallak . |
| 3,511,643 | 5/1970 | Vallak et al. ............... 75/500 |
| 4,009,870 | 3/1977 | Obenchain ............... 266/192 |
| 4,936,908 | 6/1990 | Takahashi et al. ............ 75/501 |

FOREIGN PATENT DOCUMENTS

| | | |
|---|---|---|
| 0015396 | 9/1980 | European Pat. Off. . |
| 0031160 | 7/1981 | European Pat. Off. . |
| 3305611 | 8/1984 | Fed. Rep. of Germany . |
| 1545464 | 11/1968 | France . |
| 74452 | 2/1976 | Luxembourg . |

OTHER PUBLICATIONS
Patent Abstracts of Japan, vol. 2, No. 48, (C-10), Jan. 17, 1978, & JP A, 53004709 (Shin Nippon Seitectus K.K.) Jan. 17, 1978.

*Primary Examiner*—Melvyn J. Andrews
*Attorney, Agent, or Firm*—Bell, Seltzer, Park & Gibson

[57] ABSTRACT

For the metallurgical treatment of a molten metal bath (1) in a metallurgical smelting and refining vessel (3), additive substances (43) which are capable of flow, in particular lime, are supplied in a granular to dust state, at least during a part of the refining phase, to the upper region of the inward side (15') of the vessel wall (11), distributed around the periphery thereof. At the vessel wall (11) the additive substances (43) form a barrier or protective layer which reduces the energy losses and increases the service life of the vessel (3).

16 Claims, 1 Drawing Sheet

PROCESS FOR INTRODUCING ADDITIVE SUBSTANCES WHICH ARE CAPABLE OF FLOW INTO A METALLURGICAL VESSEL AND A VESSEL FOR THAT PROCESS

FIELD OF THE INVENTION

The invention relates to a process for introducing additive substances into a metallurgical vessel.

BACKGROUND OF THE INVENTION

It is conventional practice, for the metallurgical treatment of a molten metal, to supply the vessel provided for the treatment operation with additive substances, in addition to the charge material (ores or metals in a solid or liquid condition) in order to accelerate slag formation and to provide the desired composition for the molten metal bath. The additive substances are added to the molten metal either together with the charge material when the vessel is being charged or during the melting process or at the beginning of the refining phase.

British patent specification No 843 714 describes a method of prolonging the service life of the refractory lining of a Kaldo converter. That publication states that, when oxygen is blown on to the molten iron during the refining procedure, it is generally not sufficient to supply the molten bath with coolant such as limestone, quicklime or iron ore in order to resist excessively high temperatures. It is stated that, at the average temperature of the molten metal, which is required for carrying out the process, local overheating occurs in the region of the converter in which the jet of oxygen encounters the molten metal and reacts therewith. Due to radiant heat from that area and post-combustion of the carbon monoxide which issues, local overheating and damage to the lining of the converter is then caused. In order to prevent that from happening, at least a part of the required coolant is blown through a lance in the granular condition by means of a carrier gas such as water vapour or carbon dioxide, against the region of the refractory lining which is subjected to the highest thermal loading. That procedure provides an effective screening action. At the same time the lime which remains clinging to the wall protects the latter from chemical attack by the slag and insulates it to prevent the transmission of heat. In that way it is possible substantially to increase the service life of the refractory lining of the furnace. The grain size of the lime is said to be in the range of from 0.5 to 10 mm and the amount of lime required is specified as being about 130 Kg/t to 140 kg/t of crude iron.

German patent specification No 2 210 713 discloses a process for protecting the refractory walls of a converter during operation thereof, wherein carbon-bearing material is continuously or periodically applied to the inside wall surface, as a wearing material. That is effected by introducing a carbon-bearing material in a pasty form or in a form of being capable of flow, by way of wall nozzles distributed in the converter around the periphery thereof. Thus for example hot oil or tar or pitch is introduced through wall nozzles disposed above and below the surface of the bath, during the metallurgical treatment of the molten iron.

SUMMARY OF THE INVENTION

The object of the present invention, is to improve the mechanical and thermal protection for the wall of the vessel without additional refractory material having to be made available for that purpose. The invention further seeks to provide that the supply of the additive substances is to be possible in a simple fashion to the parts of the vessel which are most highly loaded, without a lance and carrier gas. The invention also seeks to provide that, in the case of a smelting and refining vessel which is loaded with solid charge materials such as scrap metal, mechanical protection is also to be afforded in the wall and bottom region of the vessel, in the charging operation.

The invention also aims to provide a metallurgical vessel for carrying out that process, which is distinguished by an increase in the service life of the refractory lining and low levels of thermal loss.

The additive substances are supplied to the upper region of the inward side of the wall of the vessel, distributed around the periphery thereof, in a continuous or intermittent mode at least during a part of the refining phase, in a granular to dust condition, and move downwardly along the inward side of the vessel wall, as a result of their weight. They cover the inward side of the wall of the vessel and remain partly clinging thereto. They thus form a barrier or protective coating for the vessel wall which, after consumption thereof in the course of a metallurgical treatment, can be easily and continuously replaced by a feed of fresh additive substances. The amount of heat transmitted to the vessel wall is reduced by the additive substances. Besides a saving on energy, the reduced dissipation of heat also results in the duration of a metallurgical treatment operation being reduced. Furthermore the additive substances provide protection for the vessel wall, from chemical effects.

It has been found advantageous for the additive substances also to be supplied to the inward side of the vessel wall during or at the end of the tapping phase. In that way it is already possible for a barrier or protective layer to be built up on the inward side of the vessel wall by the supply of additive substances at the end of a preceding and at the beginning of a new working cycle. The layer formed by the additive substances can extend over almost the entire inward side of the vessel wall. The supply of additive substances during or at the end of the tapping phase avoids the necessity to maintain or repair the inward side of the vessel wall or a lining of refractory material at that location, prior to beginning a fresh working cycle. That means that the charge of a metallurgical smelting or refining vessel and thus the level of productivity can be increased. Furthermore, when loading the charge material for the next working cycle, that is to say when charging charge material which is cold in comparison with the molten material which has been tapped off, the thermal shock applied to the vessel wall is reduced. Finally, the protective layer formed from additive substances prior to the operation of charging the vessel with solid charge material such as scrap cushions the mechanical loading during the charging operation in the bottom and wall region of the vessel.

Preferably the additive substance used is a mixture of quicklime and up to 10% by weight of magnesia (MgO).

A metallurgical vessel according to the invention for carrying out the process according to the invention comprises a cover with cover edge openings for the supply of additive substances contained in the edge region of the cover, distributed around the periphery thereof, the openings opening into the interior of the vessel adjoining the inward side of the vessel wall. In that way the additive substances can be easily and specifically introduced into respective regions which extend in the peripheral direction, of the inside surface of the vessel wall.

In the case of a metallurgical vessel in which oxygen nozzles for injecting an oxygen-bearing gas open through the wall beneath the maximum level of the bath, the cover edge openings are respectively disposed in the regions above the oxygen nozzles. If further nozzles which can be operated as burners or for introducing oxygen-bearing gases for the post-combustion operation open through the vessel wall above the maximum level of the bath, those nozzles are to be displaced relative to the cover edge openings in the peripheral direction of the vessel.

The cover edge openings are preferably communicated by way of conveyor pipe with at least one supply container disposed at a higher level for the additive substances. Closure or shut-off members are provided in the conveyor pipes for controlling the flow therethrough.

In an advantageous embodiment at its centre the cover has an opening for the discharge of hot waste gases and for the charging of charge materials into the metallurgical vessel.

BRIEF DESCRIPTION OF THE DRAWINGS

An example of the process according to the invention and an embodiment of a metallurgical vessel according to the invention are described in greater detail hereinafter with reference to the accompanying drawings in which.

DETAILED DESCRIPTION OF THE PREFERRED EMBODIMENTS

Figure 1:
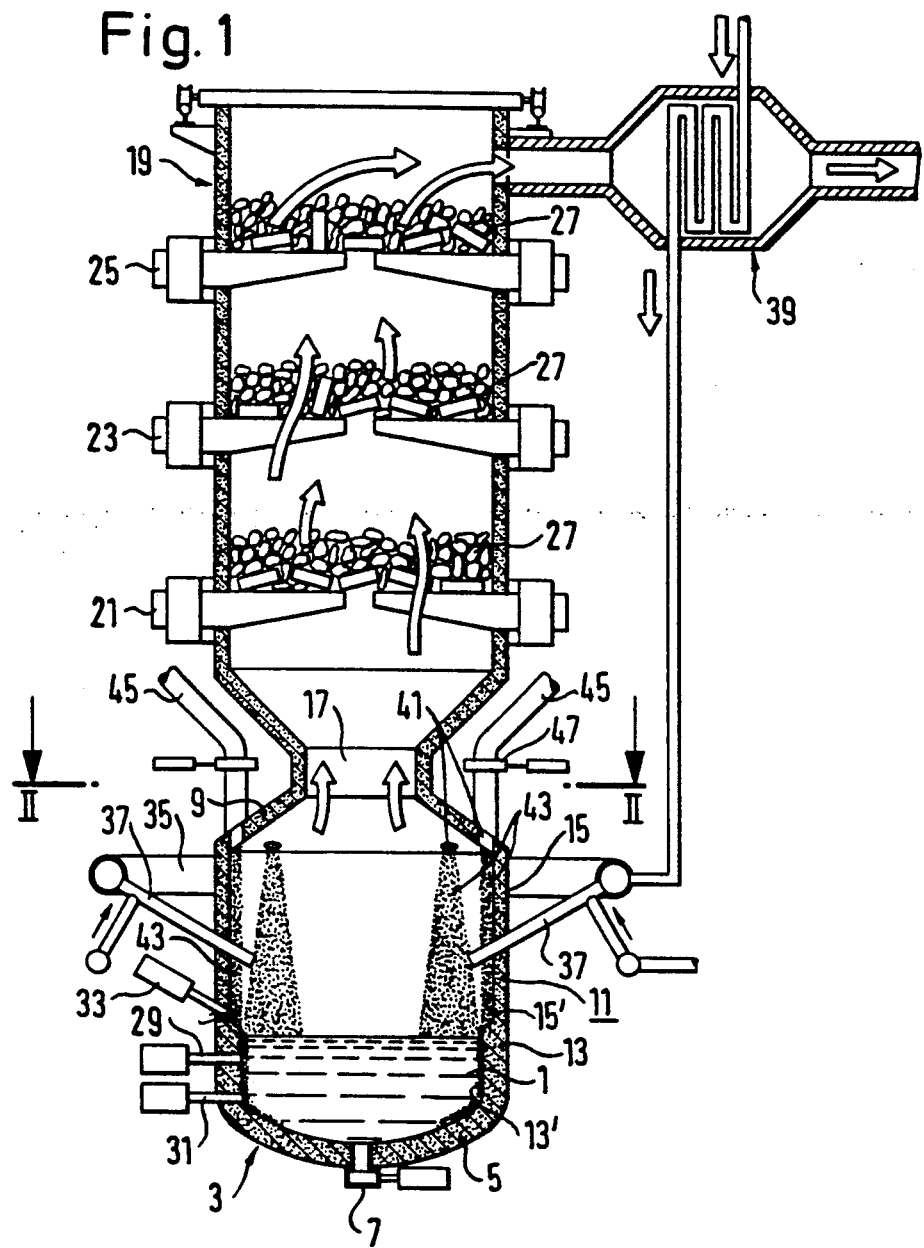
FIG. 1 is a simplified diagrammatic view in section through what is known as an energy-optimised smelting and refining assembly, also known as an EOF; an assembly of that kind is described in detail in German Laid-open application (DE-OS) No. 37 35 150 to which reference is directed.
Figure 2:
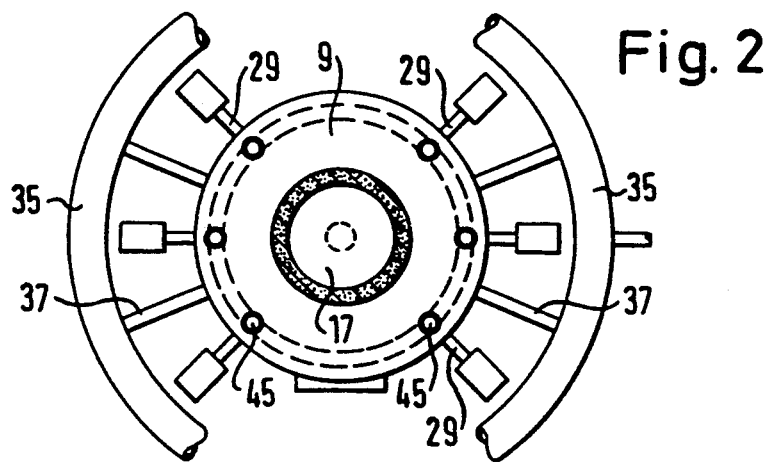
FIG. 2 is a view in section taken along line II—II in FIG. 1.

Disposed in the lower region of the assembly is a smelting and refining vessel (metallurgical vessel) 3 for accommodating a molten bath 1. A tapping device 7 is provided at the centre of a bottom region 5 of the vessel 3. A cylindrical vessel wall 11 extends substantially in a vertical direction from the bottom region 5 which is of a spherically curved configuration. A cover 9 is mounted on the edge of the vessel wall 11. The vessel wall is lined with a refractory material in its lower region 13 which accommodates the molten bath 1, that is to say in the region of the furnace hearth. The inward side of that region is identified by reference numeral 13'. The upper region 15 of the vessel wall 11, the inward side of which is identified by reference numeral 15' and which is of smaller wall thickness and which adjoins the lower region 13 passes at its upper end into the cover 9 which adjoins same in a substantially frustoconical configuration. The upper region 15 of the vessel wall is formed by water-cooled wall elements. Disposed at the centre of the cover 9 is a through opening 17 for the operation of charging charge material 27 such as steel scrap or the like and for the discharge of hot waste gases from the vessel 3. In a direction in opposite relationship to the bottom region 5, adjoining the cover 9 is a charging material preheater 19 with grid members 21, 23 and 25 through which the hot waste gases can flow, for receiving the charge material 27. For further details of the charging material preheater, attention is directed to German laid-open application (DE-OS) N 37 35 150.

Beneath the maximum level of the bath, the smelting vessel 3 contains under-bath nozzles 29 for the injection of oxygen and solid material nozzles 31 for the injection of solid materials such as for example fine-grain carbon, into the molten bath 1. In addition, provided in the region above the molten bath 1 are burners 33 and a ring conduit 35 which communicates with further nozzles 37 for injecting air which has been preheated in a heat exchanger 39.

In its edge region and distributed around its periphery the cover 9 has cover edge openings 41 for the supply of additive substances 43. For example from 4 to 10 cover edge openings may be provided in the cover 9, distributed around the periphery thereof, for the supply of additive substances 43 from a grain form to a dust form, such as quicklime CaO or a mixture of quicklime and up to 10% by weight of magnesia MgO. In the structure illustrated there are six openings 41. The additive substances can be blown against the inward side 15' of the vessel wall 11 by way of nozzles (not shown) by means of a gas flow, for example a stream of nitrogen. In that connection the cover edge openings 41 may be so arranged and of such a configuration that the additive substances 43 are blown with a tangential component against the inward side 15' of the vessel wall.

Preferably however the additive substances 43 are supplied exclusively due to the force of gravity from a supply container (not shown) disposed at a higher level, by way of conveyor pipes 45 which are connected to respective ones of the cover edge openings 41, above same. In the illustrated structure, the region of the conveyor pipes 45 which adjoins the cover edge openings 41 is perpendicular so that the additive substances flow perpendicularly downwardly against the inward side 15' and 13' of the vessel wall. The direction of entry of the conveyor flow into the vessel can be altered by altering the direction of that portion of the conveyor pipes. Each of the conveyor pipes has a closure or shut-off member 47 which can be actuated by means of a control member and by means of which the supply of additive substances can be controlled.

The additive substances which are continuously or intermittently supplied through the cover edge openings move under the effect of their own weight downwardly along the inward sides 15' and 13' on to the bottom region 5, in which case they partly remain clinging to the inward sides of the vessel wall.

By virtue of a continued supply of additive substances and by virtue of the additive substances 43 clinging to the inward sides 15' and 13', a barrier or protective layer is formed, to reduce the transfer of heat from the interior of the smelting vessel 3 to the vessel wall 11. That is particularly important in relation to vessel walls consisting of water-cooled elements. With the same amount of energy being supplied, more heat is available for the metallurgical treatment of the molten bath 1, by virtue of the reduction in heat losses. That results in a treatment time of shorter length and in addition the level of thermal loading on the vessel wall 11 is reduced. Those effects can also be achieved in relation to a part of the bottom region 5, by virtue of additive substances which are deposited in the bottom region 5.

The smelting vessel has under-bath nozzles 29 which are distributed around the periphery thereof and through which oxygen is injected into the molten material. The silicon contained in the molten iron bath is converted at the injection locations into silicon dioxide which in particular at lower temperatures has a high level of affinity for magnesium oxide which essentially constitutes the cladding or refractory material in the region of the furnace hearth. Accordingly it is subjected to severe attack.

The process according to the invention preferably provides that lime is supplied as the additive substance, above the oxygen injection locations, so that in the region of the latter there is sufficient lime available to neutralise the silicon dioxide and corrosion of the refractory lining in that area is substantially prevented.

When the vessel is being charged with material, the protective layer formed by the supply of additive substances also protects the furnace walls and the bottom region from a mechanical loading. That is particularly important in relation to a smelting assembly in which piece charging material such as scrap is supplied under free fall conditions from a charging material preheater which is disposed above the smelting assembly, that is to say, in relation to a smelting assembly of the kind illustrated in the drawings.

The additive substances 43 are supplied in a condition from grain to dust, wherein the grain size is to be smaller than 17 mm. They are supplied at least during a part of the refining phase but preferably they are also supplied during or at the end of the tapping phase.

The additive substances 43 further protect the vessel wall 11 from undesirable chemical effects so that in that regard also the service life of the vessel wall 11 and thus the smelting vessel 3 is extended.

The formation of the barrier or protective layer at the inward sides 15' and 13' and in the bottom region 5 of the vessel 3 means that maintenance or repair operations which usually have to be carried out on the vessel wall 11 subsequent to a tapping phase can be substantially omitted. The thermal shock on the vessel wall, which may happen when the batch materials 27 are being charged into the smelting vessel 3, is reduced by the barrier and protective layer.

A working cycle is described hereinafter.

After tapping and charging of the vessel 3, at the beginning of the smelting operation oxygen is injected by way of the under-bath nozzles 29 into a residual amount of molten material which has remained in the smelting vessel in the tapping operation. In that situation the temperature of the molten bath 1 which is still low rises to about 1000° C. to 1200° C.; in that case, a first reaction by oxidation of Si to $SiO_2$ takes place in the area around the injection locations. When that happens, the protective layer consisting of additive substances 43 prevents undesirable corrosive chemical reactions in the region of the inward sides 15' and 13' of the vessel wall and in the bottom region 5. The supply of lime-bearing additive substances is continued with the injection of oxygen until the charge material 27 which is introduced into the smelting vessel 3 is completely melted and the slag is fully formed. With a smelting vessel 3 which is designed for a capacity of 28 t, about 1800 kg of lime is required for a smelting and refining operation which lasts for about 35 minutes. The lime is supplied by way of the cover edge openings 41 at a supply rate of about 50 kg/minute.

The final temperature of the molten bath which is attained after the smelting and refining period is about 2000° C. Hot CO-bearing gas which is produced in the smelting process is passed into the charging material preheater 19 by way of the through opening 17 after a post-combustion phase by virtue of the hot air which is injected by way of the nozzles 37 in order to preheat the charge material carried on grid members 21, 23 and 25.

Heat losses occur in the smelting vessel 3, in particular in the upper region 15 of the vessel wall 11 which is formed by the water-cooled elements. The energy loss at the water-cooled elements can attain a value of about 10,000 kJ/minute per $m^2$ of water-cooled wall area. The supply of additive substances 43 by way of the cover edge openings 41 on to the inward side 15' of the vessel wall, and the resulting formation of a barrier and protective layer, substantially reduces the transfer of heat to the water-cooled elements and thus the loss of energy.

That which is claimed is:

1. A process for introducing additive substances which are capable of flow into a metallurgical smelting and refining vessel for metallurgical treatment of a molten metal bath, the vessel including a furnace hearth of refractory material for accommodating the molten metal bath, underbath nozzles opening into the furnace hearth for the injection of a refining gas, a generally cylindrical vessel wall adjoining the hearth in an upward direction and having an inward side and an upper peripheral region, and a vessel cover over the vessel wall, said process including the steps of:

supplying the additive substances in a granular to dust state to the upper peripheral region of the inward side of the vessel all and flowing downwardly along the inward side of the vessel wall during at least during part of a refining phase; and covering the inward side of the vessel wall with the additive substances supplied to the upper peripheral region of the inward side of the vessel wall and flowing downwardly along the inward side of the vessel wall so that a portion of the additive substances remain clinging to the inward side of the vessel wall thus forming a protective coating for the vessel wall.

2. A process according to claim 1 wherein the vessel cover has an edge region and includes openings in the edge region thereof, and wherein the step of supplying the additive substances comprises supplying the additive substances through the vessel cover edge openings.

3. A process according to claim 1 wherein conveyor pipes are connected to the vessel cover edge openings, and wherein the step of supplying the additive substances comprises supplying the additive substances through the conveyor pipes and the vessel cover edge openings by gravitational force.

4. A process according to claim 1 wherein the step of supplying the additive substances comprises supplying the additive substances from respective locations above the underbath nozzles opening into the furnace hearth.

5. A process according to claim 1 further comprising the step of supplying the additive substances in a granular to dust state to the upper region of the inward side of the vessel wall and flowing downwardly along the inward side of the vessel wall during or at the end of a tapping phase.

6. A process according to claim 1 wherein the step of supplying the additive substances comprises supplying a material which includes quicklime (CaO).

7. A process according to claim 1 wherein the step of supplying a material which includes quicklime (CaO) further comprises supplying a material which is a mixture of quicklime and up to 10% by weight of magnesia (MgO).

8. A process according to claim 1 wherein the step of supplying the additive substances comprises supplying the additive substances with a tangential component to the vessel wall.

9. A metallurgical vessel comprising:
   a furnace hearth of refractory material having a generally cylindrical sidewall for accommodating a molten metal bath;
   a cylindrical vessel wall positioned on the furnace hearth and comprising a plurality of water-cooled elements, said vessel wall defining an interior portion of the vessel and having an inward side and an upper peripheral region;
   a vessel cover positioned over the vessel wall, said cover having a peripheral edge region and a plurality of cover edge openings distributed around said peripheral edge region, said cover edge openings being open into the interior portion of the vessel and adjoining the inward side of the vessel wall so that a portion of additive substances supplied through said cover edge openings covers the vessel wall to thereby form a protective coating for the vessel wall.

10. A metallurgical vessel according to claim 9 further comprising a plurality of oxygen nozzles extending through the sidewall of said furnace hearth for injecting an oxygen-bearing gas into a molten metal bath within said furnace hearth.

11. A metallurgical vessel according to claim 10 wherein said cover edge openings are respectively arranged above said oxygen nozzles.

12. A metallurgical vessel according to claim 11 further comprising a plurality of air nozzles extending through said vessel wall and into the interior of said cylindrical vessel wall above the molten metal bath, and wherein said air nozzles are horizontally offset around said cylindrical vessel wall relative to the cover edge openings.

13. A metallurgical vessel according to claim 9 further comprising at least one supply container positioned at a higher level than said vessel, and a plurality of conveyor pipes connected between said at least one supply container and respective cover edge openings for the additive substances.

14. A metallurgical vessel according to claim 13 further comprising respective closure members associated with said conveyor pipes for controlling the supply of additive substances therethrough.

15. A metallurgical vessel according to claim 9 wherein said vessel cover has a central opening extending therethrough for the discharge of hot waste gases and for the charging of charge material into the vessel.

16. A metallurgical according to claim 15 further comprising a charging material preheater having a lower opening communicating with said central opening of said vessel cover and through which hot waste gases issuing from the vessel can be introduced into the charging material preheater and through which the charge material heated in the charging material preheater can be charged into the vessel.

* * * * *

UNITED STATES PATENT AND TRADEMARK OFFICE
CERTIFICATE OF CORRECTION

PATENT NO. : 5,201,941
DATED : April 13, 1993
INVENTOR(S) : William Wells

It is certified that error appears in the above-identified patent and that said Letters Patent is hereby corrected as shown below:

Column 3, line 19, delete "pipe" and substitute therefore --pipes--.

Column 3, line 26, delete "materials" and substitute therefore --material--.

Column 3, line 38, delete "Laid-" and substitute therefore --laid- --.

Column 4, line 6, delete "N" and substitute therefore --No.--.

Column 6, line 34, delete "all" and substitute therefore --wall--.

Col. 7, line 1, "1" should read --6--

Signed and Sealed this

Eighteenth Day of January, 1994

Attest:

BRUCE LEHMAN

Attesting Officer     Commissioner of Patents and Trademarks